Figure 1:
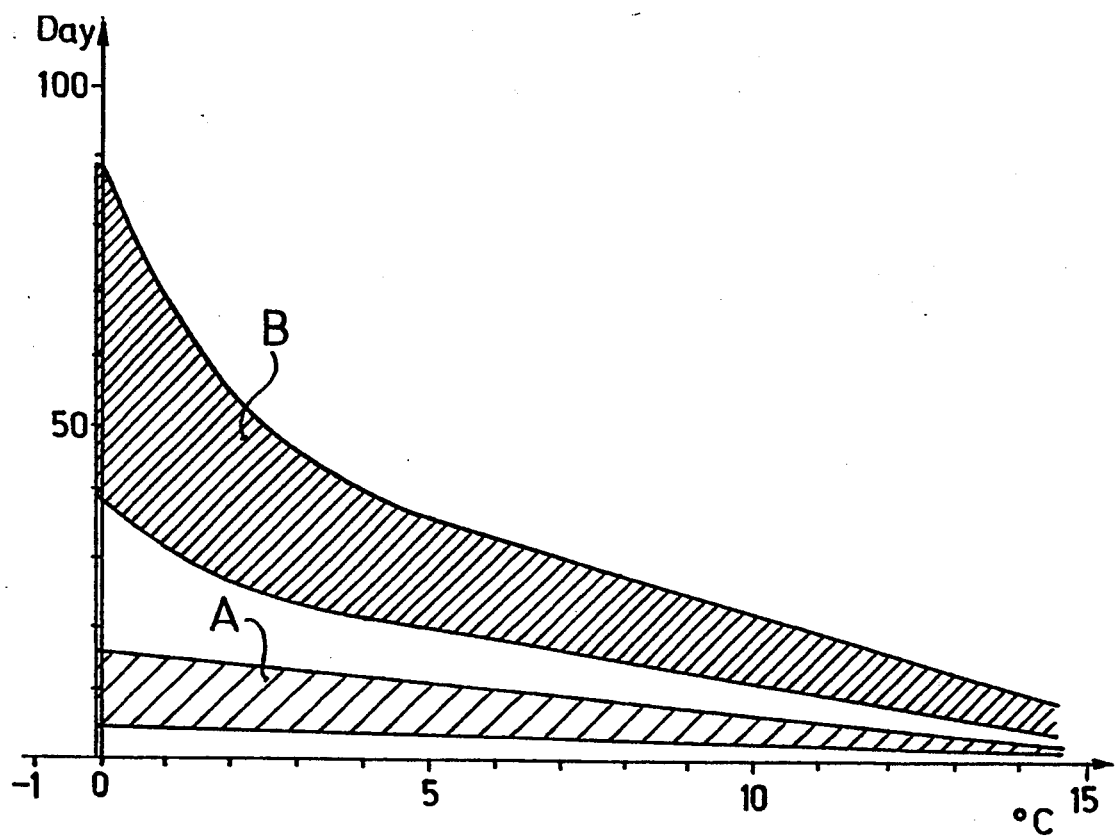

United States Patent [19]

Subotics et al.

[11] Patent Number: 5,403,609

[45] Date of Patent: Apr. 4, 1995

[54] METHOD AND EQUIPMENT FOR STORING FOODSTUFFS, PLANTS, VEGETABLES, MEATS AND OTHER ORGANIC SUBSTANCES

[75] Inventors: Gyula Subotics, VIII. utca 48, H-1172 Budapest; Gyuláné Subotics, Budapest, both of Hungary

[73] Assignee: Gyula Subotics, Budapest, Hungary

[21] Appl. No.: 949,546

[22] PCT Filed: Apr. 19, 1991

[86] PCT No.: PCT/HU91/00015

§ 371 Date: Nov. 19, 1992

§ 102(e) Date: Nov. 19, 1992

[87] PCT Pub. No.: WO91/15970

PCT Pub. Date: Oct. 31, 1991

[30] Foreign Application Priority Data

Apr. 20, 1990 [HU] Hungary .................. 2489/90

[51] Int. Cl.⁶ .................. A23L 3/00; F25D 17/00
[52] U.S. Cl. .................. 426/524; 62/407; 62/426; 62/441; 426/418
[58] Field of Search .................. 426/231, 232, 524, 418; 62/413, 426, 432, 265, 407, 441

[56] References Cited

U.S. PATENT DOCUMENTS

| | | | |
|---|---|---|---|
| 4,210,000 | 7/1980 | Lee | 62/426 |
| 4,662,186 | 5/1987 | Park | 62/441 |
| 4,958,506 | 9/1990 | Guilhem et al. | 62/432 |

FOREIGN PATENT DOCUMENTS

| | | |
|---|---|---|
| 535722 | 1/1957 | Canada .................. 62/426 |
| 0336791 | 11/1989 | European Pat. Off. . |
| 0345437 | 12/1989 | European Pat. Off. . |
| 2807352 | 1/1983 | Germany . |
| 62-44155 | 2/1987 | Japan . |

*Primary Examiner*—George Yeung
*Attorney, Agent, or Firm*—Handal & Morofsky

[57] ABSTRACT

This invention concerns a process and device for storing foodstuffs, plants, meat and other organic substances in which the products to be stored are held in a hermetically sealed cold chamber with no apertures, where the temperature is even everywhere and lies in the range from +0.5° to −0.5° C. The device has at least one chamber (1) which can be hermetically sealed by a cover, whereby the chamber (1) and the cover (12) are bordered by double walls enclosing sealed spaces (2, 6) and the sealed spaces (2, 6) are in mutual heat-conducting communication, the inner of the double walls is preferably made of plastic and the sealed spaces (2, 6) are filled with a refrigerated, non-freezing fluid and the outside of the double wall is lagged (3).

21 Claims, 5 Drawing Sheets

METHOD AND EQUIPMENT FOR STORING FOODSTUFFS, PLANTS, VEGETABLES, MEATS AND OTHER ORGANIC SUBSTANCES

The invention relates to a method and equipment for the storage of foodstuffs, vegetables, meats and other organic substances, and the product to be stored is put into a sealed closed, openable, cooled chamber.

As is known, the usability of foodstuffs stored in refrigerators can be used through a period of several days depending on the kind of products. The duration of possible storage without loss of quality is in direct relation with the amount of heat extracted by the surroundings, i.e. with the extend of cooling of the product. At temperatures above 0° C., most substances of vegetable of animal origin can be stored for short periods of time without risking deterioration. E.g., lettuce or radish become withered and unusable after 1 or 2 days of storage on open shelves of conventional refrigerators. At temperatures below 0° C., and especially in freezers where the temperature is kept around or in given cases below −18° C. the storage times may be as long as 1 year in the case of certain kinds of foodstuffs. However, with these procedures applying high rates of heat extraction and deep-freezing, damage of cells manifesting itself in a high degree of loss of quality after thawing cannot fully be eliminated. With refrigerating machines known so far, the chamber temperature is usually controlled so as to follow the temperature of the cooling plate incorporating the evaporator of the cooling circuit, which has the drawback, that the cooling plate does not cover the entire inner surface of the chamber, but only a small part of it, some parts within the chamber tend to assume different temperatures. So, for examples, the surface of the cooling plate is generally colder than the remaining inner surface of the chamber. Since the cooling circuit is switched on and off cyclically, also the cooling and heating periods follow each other cyclically, the temperature of the cooling plate also varies accordingly. As shown by measurements, the temperature variation within the chamber in space and time can exceed a span of 4 to 5° C. Due to the different temperatures and various temperature differences, air flows develop within the inner space, contributing to the evaporation of water present in the cells of products and thereby to their desiccation.

Because of within such wide temperature changing in the case of known kinds of refrigerators and known cooling methods, in the chambers serving for the storage of the various foodstuffs, mainly vegetables, fruits, etc., the average temperature is adjusted to lie between 3 to 4° C., ensuring thereby that the temperature will possibly be prevented from dropping below 0° C. within the chamber. Namely, in the case when the temperature decreases under 0, due to freezing, the cells may suffer severe damages, whereby the foodstuffs may become unsuitable for human consumption within a short time.

Since the metabolism of cells of some foodstuffs, mainly that of vegetables and fruits, is still considerable enough at 3–4° C., at such storing temperatures the cells get aged within rather short periods of time (within a few days in some kinds of cells), and the viruses, and bacteria settling on foodstuffs proliferate, whereby the stored goods may soon become unsuitable for consumption.

The refrigerating machine specified in HU-PS 185130 is provided with a cooling circuit comprising a single compressor and a number of chambers independently controlled to different temperatures, and in the primary cooling circuit having capillaries several evaporators are arrenged and there is a secondary cooling circuit consisting of a liquefaction apparatus (condensing equipment) and an evaporator. Since with this known arrangement the chambers of the refrigerating machine are cooled by cooling plates comprising an evaporator in the cooling circuit, the drawbacks characteristic of designs operating with cooling plates exist also here.

With open-top cooling desks it is known that the bottom and the two opposite-side walls of the cooling desk around the cooling space are surrounded by a "U"-shaped air duct through which the air cooled by a pipe coil arranged at the bottom of the cooling desk and being sucked in from the ambient atmosphere is circulated. Such an arrangement is described e.g. in the Hungarian Patent Specification No. 182 163, according to which the cooling desk is provided with an automatic defrosting system. Thereby, in cooling mode the air sucked in by the air blower through the openings arranged at the ends fo the air duct is forced to flow in forward direction toward the cooling pipe coil. At a defined amount ice formation the system switches over to defrosting mode.

In that mode of operation the air is forced by the air blower to flow in the air duct in reverse direction, sucking the ambient air from the atmosphere surrounding the cooling desk. As the temperature of the ambient air is higher than that of the cooled air, it causes defrosting of the system. With this arrangement, since—on the one hand—it refers to an open—top cooling desk where the effects of ambient air flows cannot be eliminated and—on the other hand—the intake side of the covering desk is always heated by the air sucked in from the surrounding atmosphere and forced to flow along the three sides (two lateral sides and bottom) of the cooling desk, and only its lower part, as well as the opposite side i.e. the side lying toward the air outlet is cooled, consequently, with cooling desks employing this system, the temperature widely varies in the function of place and time within the cooling space. Thus, with cooling desks of that system, the conditions of maintaining the temperature at a constant value within the entire cooling space, indispensable for ideal preservation, cannot be ensured. Therefore, these cooling desks are mainly operated in the temperature range below 0° C., primarily for storing frozen and quick-frozen foodstuffs.

From the patent application published on Feb. 9, 1990 in Great Britain under the number 2221377A a method and an equipment are known for preserving vegetables, meats or several organic substances.

By using said solution such organic substances can be preserved too, for the preserving of which no other method is known. (Such Substances are for example the organs used for transplantation etc.). This known method preferably should be used in the fields, where continuous supply can not be ensured or there is no supply-network settled, and as such continuous obtaining of foodstuff is available only from places being far away from the habitation. In such supply-circumstances it should be advantageous, if some kinds of foodstuffs by maintaining their good quality for longer period of time should be stored in the households.

However in great settlings, in the towns of the highly industrialized countries the continuous supply on goods has been ensured. Here the task to be solved is to ensure preserving where the good quality of the products will be maintained for 1-2, preferably for even 3 weeks, and the consumer will not be forced to deal every day with obtaining (buying) of foods, but it is enough to fill up the storage capacity at home once in a week or every two or three weeks from the big markets (preferably in big quantity at low prices).

The present invention is aimed at developing a cooling method and equipment by which the storage time of foodstuffs, vegetables, meats or other organic substances can be extended without high additional costs to a period twice as long as that obtainable with normal household refrigerators.

The invention is based on the recognition that the storage time of foodstuffs, mainly of vegetables, without loss of quality can be doubled, or even multiplied with certain produces, by minimizing the metabolism and evaporation of water content of the cells of goods to be preserved by ensuring the required temperature and climatic conditions of evaporation through the entire storages period.

The task has been solved by method for the storage of foodstuffs, vegetables, meats and other organic substances, in the course of which the product to be stored is placed into a hermetically sealed, openable, cooled chamber, in the course of which according to the invention surrounding said closed chamber with a gas, optionally with air or with frost-resistant fluid placed in a closed space sealed off from the outside, measuring the temperature at gas or the frost-resistant fluid intermittent or continuously, and cooling said gas or frost-resistant fluid to a temperature falling between given limits within the interval of $+3°$ to $-3°$ C. under the control of an interposed thermostat and a cooling circuit, while the lower and upper temperature limits and the time required to reach the state of equilibrium are selected depending on the chamber wall thickness, on the heat conduction properties of the chamber wall, on the cycle time elapsing between switching-on and -off of the cooling circuit, on the temperature variation, specific heat and pressure of the medium surrounding the chamber from the outside, as well as on the volume of closed space surrounding the surfaces confining the chamber and on the thermal insulation of the wall of the closed space, this selection being done so that at any part of the inner surface of the chamber the temperature is kept constant in time and space within $+0.5°$ to $-0.5°$ C. optionally about 0, while the temperature of the gas or frost-resistant fluid is held within the temperature limits given above, and the gas or frost-resistant fluid continuously or intermittent, gravitationally and/or by inserting a pump, is circulated around the chamber.

The essence of the invention lies in that, the products to be stored are placed in such closed chambers (closed drawers) in which the temperature of the inner airspaces into all directions and all the time always can be held at a value approaching best 0, and any point of the confining surfaces of the inner space has a temperature approaching best the temperature of the inner space.

The evaporation of water contained e.g. in the vegetable cells can be reduced to a minimum, and the occurrence of the phenomenon of withering and desiccation can be considerably delayed in time. At the same time with reducing temperature, the metabolism of cells slows down, whereby the occurrence of ageing is put off in time. Since the temperature does not drop considerably below 0° C., so that the cells are not exposed to damages caused by freezing.

The invention relates, further, to an equipment for the preservation of foodstuffs, plants, flowers and other organic substances, the equipment being provided with at least one cooled chamber for receiving goods to be preserved and fitted with an openable closing cover that can be hermetically closed and according to the invention in that said chamber and closing cover being confined by a double wall (double walls) and the double wall(s) of said chamber and of said closing cover surrounding always adjoining, cooled and closed spaces being in mutual heat transmitting connection, and the inner wall(s) of the double walls being made preferably of plastic, whereas the outer walls of the double walls are surrounded by thermal insulation, where the closed spaces are filled up with a circulating gas or circulating frost-resistant fluid.

It is of advantage when the double wall of the chamber and the double wall of the cover plate are provided with some material of good heat conduting properties, these surfaces being in contact with each other in closed position and covered toward the stored goods by said double walls.

It is preferable when said good heat conducting surface of the double wall of the chamber is in heat transmitting contact with the cooling plate.

It is preferable when the closed spaces surrounded in the double walls of the chamber and of the cover plate are connected with a flexible tube.

It is also preferable to provide the chamber with drawers withdrawable together with the cover plate, these drawers being also surrounded - at least partially—with double walls forming confined spaces.

It is advantageous to provide the equipment according to the invention with a fan circulating the gas within the coherent closed space confined by said double walls.

It is also of advantage to provide the equipment with a pump for circulating the frost-resisting fluid contained by the coherent, confined spaces enclosed by said double walls.

The invention relates, further, to an equipment for the preservation of foodstuffs, vegetables, meats and other organic substances, the equipment being provided with at least one cooled chamber hermetically closable with an openable closing cover where the inner surface of said closing cover of the chamber complying with the invention is covered at least partially with a heat conducting material, the outer side of which is provided with some heat insulating material, whereas the further walls confining the chamber are, at least partly, double walls being in heat transmitting contact with the heat conducting material of the closing cover, further the space(s) confined by the double walls is (are) filled up with a circulating frost resisting fluid or some gas, and the inner wall of the double walls is preferably made of some plastic material.

It is advantageous when the inner surface of the closing cover is formed by a metal plate, preferably made of aluminium or copper, the inner side of which is coated with a paint or covered with a plastic layer, while its outer face is provided with reinforced sections, preferably with ribs as well as with thermal insulation. The ribs should be as grated elements.

The equipment complying with the invention can advantageously be realized in practice by modifying the conventional storing centres of cooling machine(s), in that way the cooling space, several communicating or separated storage chambers or drawers are provided, preferably confined by plastic partition walls and fitted with closable and operable closing covers. Through natural air circulation almost identical temperature conditions can be achieved in the individual storing drawers, whilst in the confined individual inner spaces of drawers any developing air motion is only negligible. The cooling of inner spaces of chambers and drawers can be made more intense and uniform by increasing natural air circulation in the communicating closed air spaces confined by the double walls and, thereby, the intensity of cooling can be enhanced e.g. by the installation and periodical or permanent operation of a built-in fan.

In order to achieve further improvement of heat conduction and to render heat extraction more uniform, the communicating confined spaces can be filled up with a frost-resisting fluid, the circulation of which can be ensured either by natural convection, or by periodical or continuous operation of a pump. Thereby, the uniformity and intensity of energy transport by material flow can further be increased. Thus, after reaching the state of equilibrium, the equality of temperature at any point of the inner surface of closed chambers and drawers can be ensured, consequently no considerable air flows can develop within the inner air spaces. If, now, the air space of chambers and drawers is cooled, preferably, to a temperature of around 0° C. and considering the reduced air flow, the operation rate of water present in the cells can considerably by reduced.

So, by the new cooling procedure—on the one hand—the temperature of the storing space is reduced with consequent reduction of metabolism of cells of goods to be preserved and deceleration of the process of their ageing, and—on the other hand—by ensuring uniform and constant temperature of the surfaces surrounding the storage space (chamber, drawer), the rate of evaporation of water present in the cells of goods to be preserved is reduced and the desiccation of goods, i.e. their withering is prevented, rendering them unsuitable for consumption.

Using plastic as material of double walls, instead of metals, is specially advantageous, because the cold radiation of plastics is generally lower than that of metals, whereby the danger of frost of the products can be avoided.

The equipment can be made according to the invention in that way, that the inner division of the refrigerating machine can be designed to contain a deep-freezer part that can be utilized, with advantage, in summer to prepare ice creams or e.g. ice cubes, etc. or, possibly, it can be provided with a dynamically cooled compartment as specified in British Patent No. 8 912 681.7, offering the possibility of considerably extending the storage time of meats, etc., further, it can be provided with as additional free storage space or a number of open compartments e.g. for the storage of boxed milk or refreshing drinks, eggs, etc. The cooling space can be completed with common or separate storing compartments possibly of different sizes confined by plastic walls and fitted with a well-fitting and easily closable plastic cover plates or lids, where the common partition walls between adjacent compartments, as well as the sides of said compartments separating the latter from the main storage space of the refrigerator are preferably provided with ducts or recesses connected with each other, in which the air circulation may either be natural or articically accelerated, or these recesses may be filled up with a frost-resisting fluid, the circulation of which may be brought about in a natural way by thermal convection or can be accelerated by a pump. The artificial circulation of air or fluid may be periodical, the switching being controlled by a time relay or a thermostat, or it may be continuous.

Figure 4:
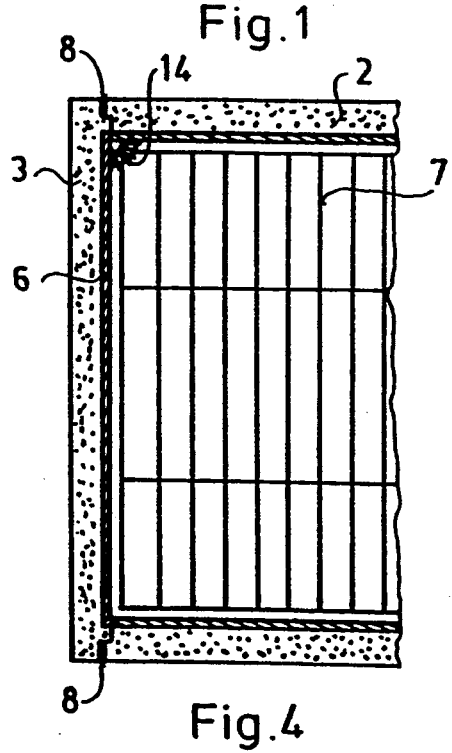
Figure 2:
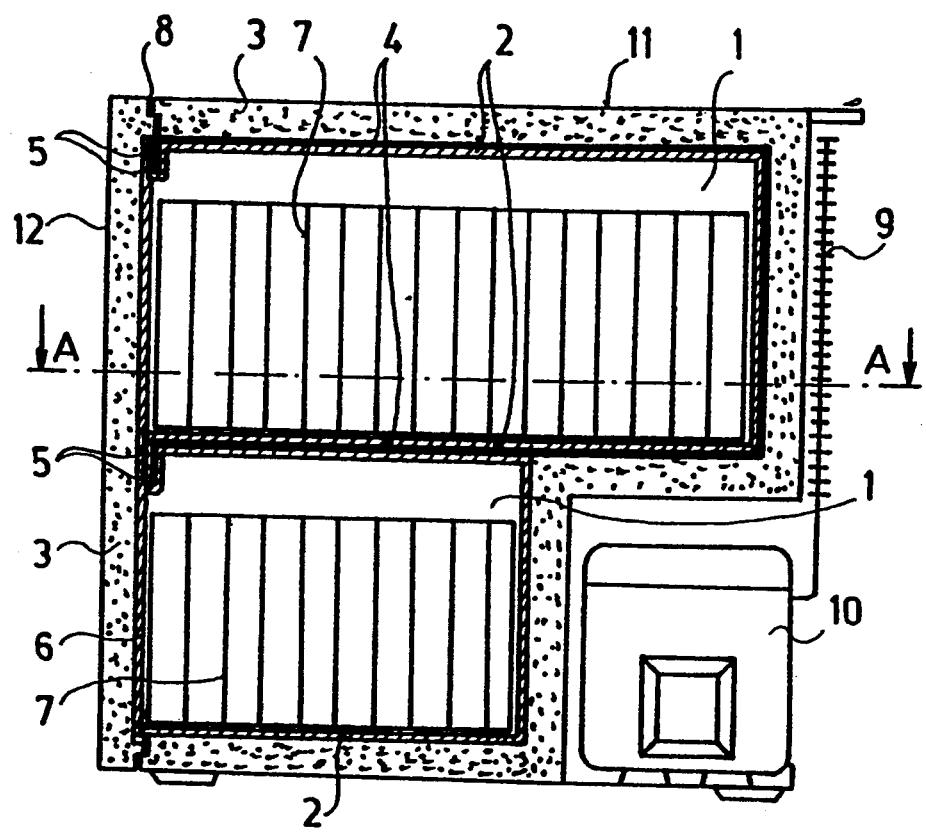
Figure 3:
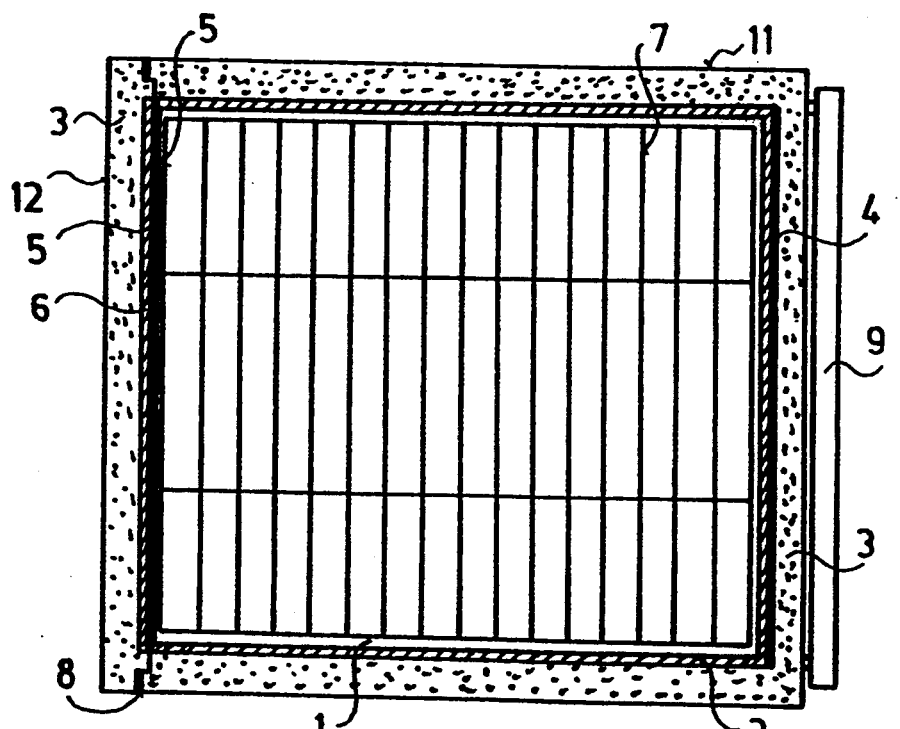
Figure 2A:
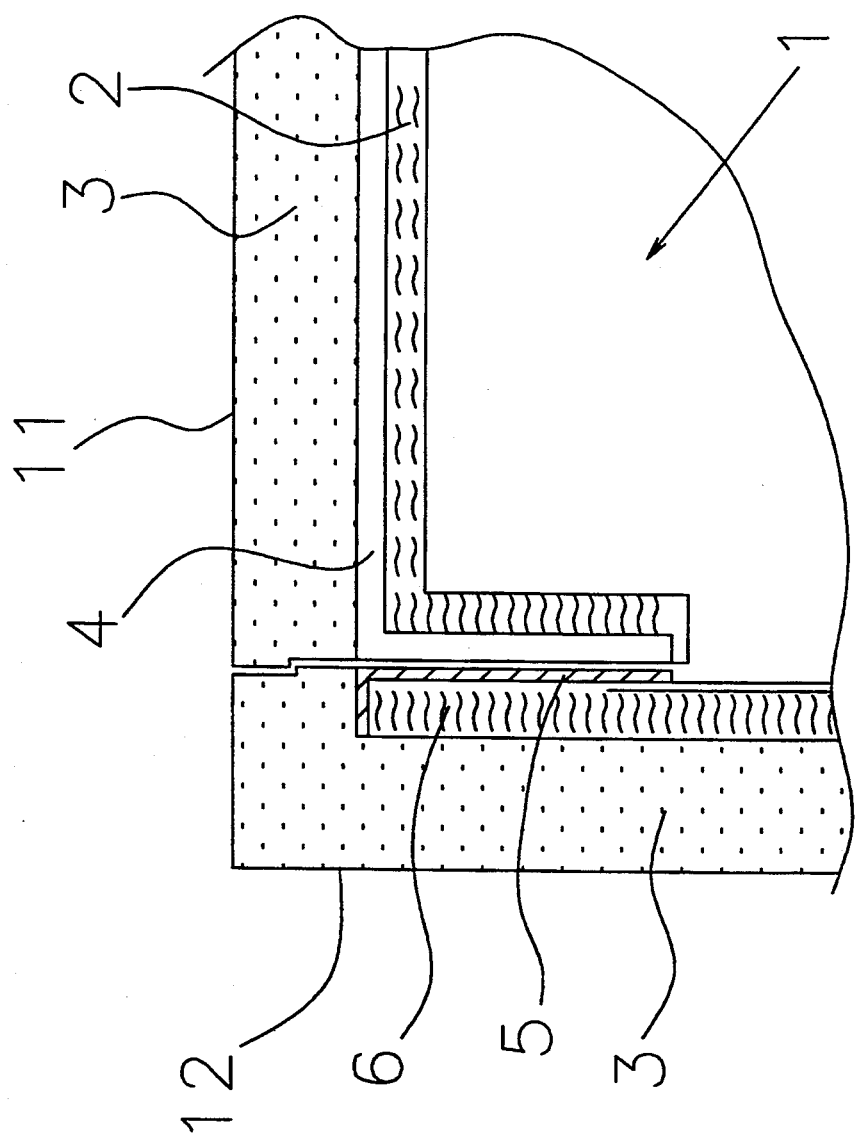
Figure 5:
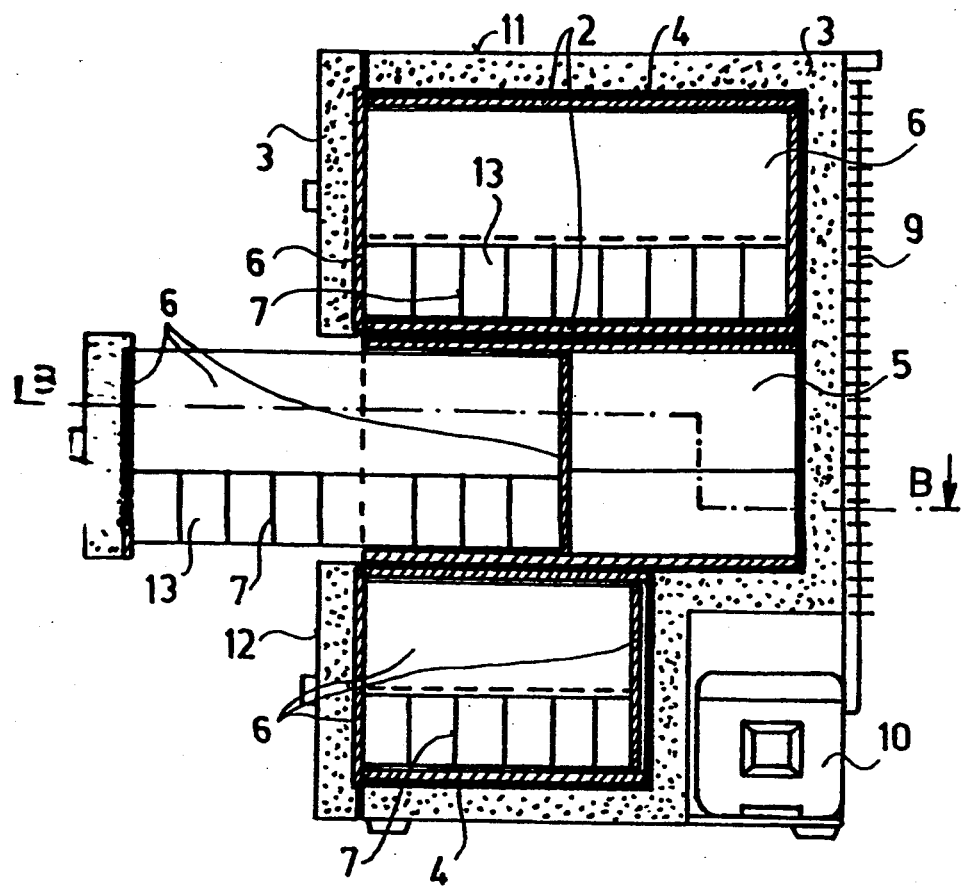
Figure 6:
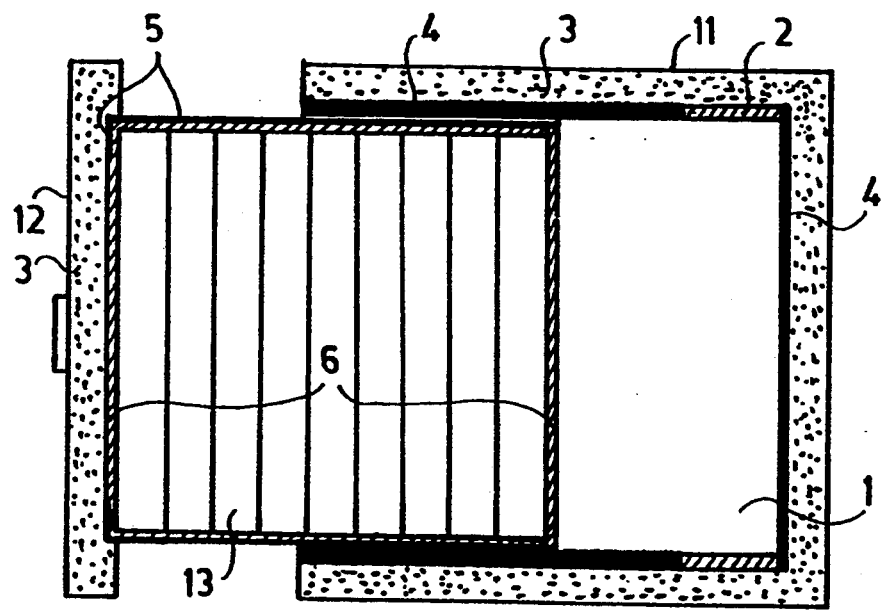
Figure 7:
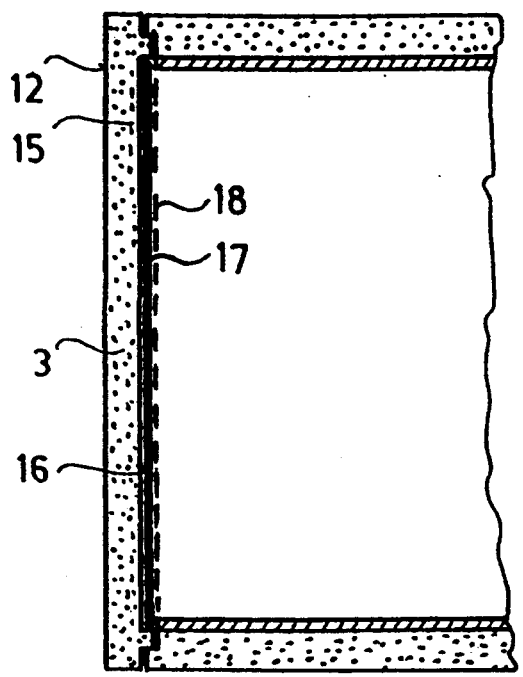
Figure 8:
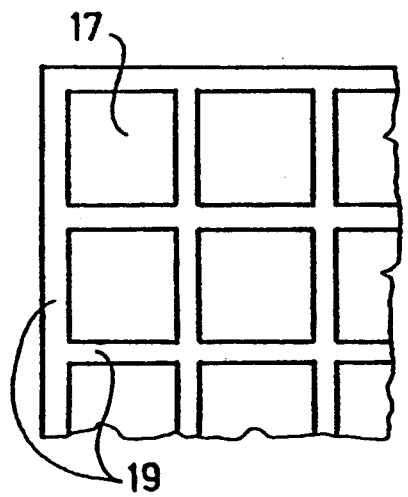
Figure 9:
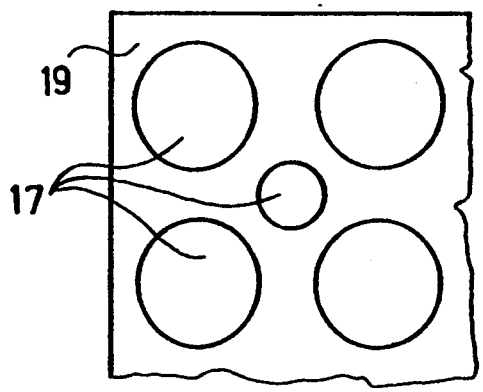
Figure 10:
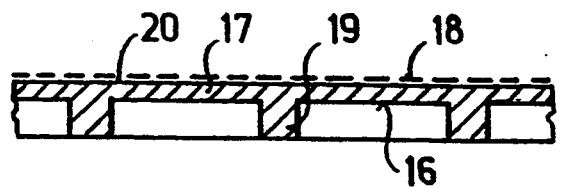

The method and equipment complying with the invention will be described in some detail in the following with reference to illustrative examples shown by the attached drawings, where FIG. 1 is a diagram showing as a function of temperature the deterioration-free storage times of various products of vegetable origin, obtainable with a method according to the invention under optimum climatic conditions of temperature and evaporation and with normal household refrigerators, FIG. 2 is a longitudinal section of a possible embodiment of food storage equipment according to the invention, FIG. 2A is an enlarged partial section of FIG. 2, FIG. 3 is a section taken along line A—A indicated in FIG. 2, FIG. 4 is a partial section of another possible food-storage equipment embodiment of the invention, having enclosed spaces between double walls of a storage chamber and closing cover connected with flexible tubes, FIG. 5 is a longitudinal section of a further possible embodiment of the invention, having a drawer-type design, FIG. 6 shows a section taken along the broken line B—B indicated in FIG. 5, FIG. 7 is a view similar to FIG. 4 of a further embodiment of the invention, where the inner surface of the cover plate of the chamber is covered with a heat-conducting material, FIG. 8 and 9 are embodiments of the outer side of a metal plate liner constituting the heat-conductive material of the preceding embodiments made of heat-conducting material; and FIG. 10 is a sectional view of another embodiment of the metal plate.

In FIG. 1 a comparison is made between the storage made by means of the method specified by the invention and the storage as taking place in conventional household-type refrigerators. In FIG. 1 based on performed experiments, storage times are plotted as a function of temperature, with the area marked "A" showing the results characteristic of conventional designs, whereas the area marked "B" refers to the designs according to the invention assuming similar conditions in each cases.

As it is clearly apparent from the FIG. 1, by application of the method and equipment complying with the invention, the storage times of goods to be stored can be considerably extended, especially at temperature below 3° C., With a possible embodiment of the invention, as shown in FIGS. 2 and 3 the inventive equipment, or cooling machine 11, consists of two chambers 1 closable with closing cover 12. The chambers 1 have compartments 7 for the storage of goods to be preserved. Chambers 1 and closing cover 12 are confined with double walls enclosing the space for storing the goods to be preserved. A continuous closed space 6 is enclosed by the double wall of closing cover 12, just as the closed space 2 formed by the double wall of chambers 1, where the closed spaces 2 and 6 can be filled up with cooled frost-resistant fluid. As may better be seen in FIG. 2A, the region in contact with cover plate 12 the double wall enclosing the chamber 1 is bent into the plane 5 parallel with closing cover 12, and its outer wall is provided with heat conducting surface 5, which comes into contact with the heat conducting surface 5 provided on the flange of the inner element of the double wall of closing cover 12, said flange bearing against said inner element exclusively in closed position of chamber 1. To the outsides of heat conducting surfaces 5, the cooling plates 4 are attached. The cooling plates 4 ensure equal temperature of the inner walls of closing cover and of those of chambers 1 by way of heat conduction through the interposed surfaces 5 and across the frost-resistant fluid contained by closed spaces 2 and 6. The heat conducting surfaces 5 are nowhere in contact with the inner space where the goods to be preserved are stored, since said surfaces 5 are fully separated from the stored goods by the inner wall of the double-walled chambers 1. In order to eliminate the heat loss, the sealing surface 8 of the closing cover 12 is provided with an isolation layer to prevent the development of air flow and heat conduction between the outer and inner air spaces.

With refrigerator 11 the cooling cycle is maintained by means of a compressor known per se, an by means of evaporator conductively coupled with cooling plates 4 and heat-exchanger surfaces 9. The required temperature stability is ensured by thermal insulation 3 placed between the outer surface of the refrigerator 11 and cooling plates 4 and spaces 2, 6 filled up with frost-resistant fluid.

Thermal insulation 3 as well as the double walls surrounding spaces 2 or 6 can be made of some transparent material, where the thermal insulation 3 can be made of a double wall with vacuum between the two plates of said double wall. The schematic diagram of the equipment shown in FIG. 4 is identical with that of the equipment of FIG. 3. The only difference lies in the method of heat transfer. Here, the heat conduction between storing space and Closing cover takes place by heat convection in such a way that the closed spaces 2 and 6 are connected by flexible tubes 14 or by corrugated-wall tubes, through which the temperatures of the frost-resistant fluids in the two closed spaces 2 and 6 can level out.

The refrigerator 11 in FIGS. 5 and 6 has serving drawers 13 for preserving of the products to be stored, which drawers 13 together with closing cover 12 can be withdrawn from the chamber 1 or pushed into chamber 1. The sides of the drawers 13 are surrounded from below and on the sides with double walls forming the closed space 6, wherein the outer wall of the double wall is provided with heat conducting surface 5, contacting the inner wall of the double wall of the chamber i in closed position, and in the closed space 2 surrounded by the double wall of the chamber i cooled frost-resistant fluid is arranged. The outer wall of the double wall of chamber 1 is contacted however with cooling plate 4.

This embodiment is advantageous from two points of view. Firstly the whole storing space of the refrigerator 11 has not to be opened when taking out the product stored, but you should draw out the drawer 13 only in which the product needed is stored. Secondly taking out the product causes only little airflow ensuring better retention of cool air and temperature in the stability than storage spaces of the embodiments having closable closing covers 12 (door).

FIGS. 7 to 10 serve for illustrating a further equipment for storing foods, vegetables, meat and other organic substances also complying with the inventions. This equipment is also provided with at least one chamber 1 openable and closable with closing cover 12 for receiving products to be preserved, the equipment differing from previously described embodiment by having the inner surface 15 of its closing cover 12 screened at least partly, with a heat conducting material. The heat-conducting material can be a metal plate 17, preferably of copper or aluminium, having an the outer side 16 provided with thermal insulation 3. Further walls around chamber 1 are, at least partly, double walls and in heat-transmitting contact with the heat conducting material of the closing cover 12. The cooled, and enclosed spaces 2 surrounded by the double walls are filled with a circulating frost-resistant fluid or circulated gas, where inner surfaces of said double walls are preferably made of some plastic material. The heat conducting material, i.e. the inner side 20 of the metal plate 17 is covered with a paint coating or with a thin plastic layer 18, whereas the outer side 16 of said metal plate 17 has reinforced sections, e.g. provided with ribs 19, (FIG. 10) or ribs 19 of chequered pattern (FIG. 8) or, as in FIG. 9, there are 5 mm thick areas having circular indentations where the plate thickness is reduced to about 0.5 mm. These plate patterns exhibit better heat conduction properties without adding undue weight. In the following the method specified by the inventions is described in detail with reference to several concrete examples.

The products are placed in a chamber constructed in accordance with the invention and the enclosing surface of which is made of plastic sheet of equal thickness throughout. All enclosing surfaces surrounding the closed space of the chamber are doubled walled and filled up with a gas, preferably air. This gas is led to the evaporator of a cooling circuit and cooled to $-0.3°$ C. By circulating the cooled gas gravitationally or by a fan, heat is absorbed by the gas from the outer surface surrounding the chamber, The temperature of the gas in increased thereby and that of the chamber wall decreased due to heat transfer. When the temperature of air reaches $+0.3°$ C., the cooling cycle is automatically started by a thermostat and kept in operation until the temperature cools off to $-0.3°$ C. again. Now, the cooling cycle is again switched off automatically by the thermostat, the process in then cyclically repeated.

The temperature of the inner surface of the chamber surrounded by 3 mm thick polyamide walls is found to fluctuate between $+0.1°$ C. to $-0.1°$ C. during the cycle time elapsing between the connection and disconnection of the thermostat, due to poor heat conduction, whereby the temperature within the inner space of the chamber can be accurately controlled to be close to $0°$ C.

In accordance with known laws of physics, the temperature variation of inner air space in the chamber depends on the wall thickness of the chamber, on the heat conducting properties of the material constituting the wall, on the cycle time, on the temperature variation, specific heat and pressure, further on the volume of the closed space surrounding the surfaces confining the chamber and on the thermal insulation of the outer wall of the closed space. The various parameters have the following effects on the temperature variation of the inner air space of the chamber:

The temperature variation of the inner space of the chamber can be reduced by incresing the thickness of the chamber walls, causing thereby the prolongation of time required to reach the state of equilibrium.

E.g., if the surfaces confining the chambers are surrounded with a substance of higher specific heat, preferably with water, then it is expedient to set the thermostat to switch on the cooling circuit at $+0.1°$ C. and to switch it off at $-0.1°$ C., to permit maintenance of a stable temperature of the inner air space of the chamber close to e.g. $0°$ C.

Summing up the above, the main advantages of the method and equipment complying with the invention are as follows:

a) The preservation time of foodstuffs of vegetable origin etc. can be extended to a multiple of preservation time of normal refrigerating machines.

b) In the course of preservation, the quality, colour, taste, smell, hardness, etc. do not suffer changes.

c) In the storage space the freely kept products maintain their original quality.

d) Products placed into the storage space may stay in contact with the confining surfaces (with the inner wall of double walls) and with each other, without any risk, offering better utilization of space, i.e. more products can be stored for preservation within the same volume, than in the case of traditional refrigerating machines e.g. cooling boxes.

We claim:

1. Powered refrigeration equipment for storage of perishable organic products, said equipment providing accurate temperature control throughout a cooled storage chamber and comprising:

a) at least one cooled storage chamber for receiving products for storage;

b) low thermal conductivity interior walls defining said cooled storage chamber, said interior walls including an interior ceiling wall extending across the top of the chamber;

c) an openable and hermetically closable cover for said cooled storage chamber, said closable cover providing a closing interior wall for said cooled storage chamber;

d) a plurality of thermally conductive coolant elements each having a coolant surface extending generally parallel with said interior walls, said coolant elements including an upper coolant element overlying said ceiling interior wall substantially throughout its extent, said conductive coolant elements being thermally coupled with a powered refrigerant unit to cool said chamber;

e) temperature-equilibrating elements completely enclosing said cooled chamber, said temperature-equilibrating elements comprising said interior walls and further comprising outer walls in thermal communication with said coolant elements, said temperature-equilibrating elements being thermally coupled together and in thermal communication with one another to equilibrate the surface temperatures of said interior walls; and wherein said temperature-equilibrating elements include double wall elements defining a cavity between said inner and outer walls and wherein a temperature-controlled, frost-resistant fluid is circulatable in said cavity, circulation of said fluid being effective to transport heat convectively between said chamber and said coolant elements to remove heat from said chamber and to equilibrate interior wall temperature differences.

2. Refrigeration equipment according to claim 1 wherein said double wall elements extend parallel to and substantially over the area of at least two interior walls of said storage chamber in addition to said ceiling interior wall, whereby said frost-resistant fluid circulates in contact with said at least two interior walls in addition to said ceiling interior wall to equilibrate temperature differences.

3. Refrigeration equipment according to claim 2 wherein said double wall elements extend parallel to and substantially over the area of all said storage chamber interior walls whereby said frost-resistant fluid circulates in contact with all said walls to equilibrate temperature differences.

4. Refrigeration equipment according to claim 1 wherein said temperature-equilibrating element comprising said closing interior wall of said closable cover is one of said double wall elements, whereby said frost-resistant fluid circulates in contact with said closing interior wall to equilibrate temperature differences in said closing interior wall.

5. Refrigeration equipment according to claim 4 comprising flexible tubing providing communication for said frost-resistant fluid between said double wall element cavities in said closable cover and said interior walls.

6. Refrigeration equipment according to claim 4 wherein said closing cover includes a thermal conductor plate engaging and extending over the area of said outer wall of said double wall element and wherein said thermal conductor plate is in thermally conductive contact with at least one of said coolant elements in a closed position of said closing cover.

7. Refrigeration equipment according to claim 1 comprising at least one slidable storage drawer, said drawer having at least one double drawer wall filled with circulatable frost-resistant fluid and covered externally of the drawer volume with a thermal conductor layer.

8. Refrigeration equipment according to claim 7 wherein said slidable drawer comprises a portion of said closable cover.

9. Refrigeration equipment according to claim 1 comprising powered circulation means to force circulation of said frost-resistant fluid.

10. Refrigeration equipment according to claim 1 comprising insulation around said storage chamber externally of said coolant elements.

11. Refrigeration equipment according to claim 4 comprising temperature sensing means to sense the temperature of said frost-resistant fluid and comprising refrigeration unit control means to cycle a refrigeration unit according to said frost-resistant fluid temperature.

12. Refrigeration equipment according to claim 1 wherein said coolant elements are plate-like, metallic elements, each extending substantially completely over an interior wall for rapid thermal conduction of heat to a refrigeration unit.

13. Powered refrigeration equipment for storage of perishable organic products, having an enclosed, cooled, product-storage chamber equipped with a movable closure for accessing the chamber and having cooling means to control the temperature of said cooled storage chamber, said cooling means comprising:

a) a cooled, double interior wall to said chamber having an interior wall surface within said chamber;

b) a temperature-buffering cavity defined within said double interior wall;

c) a controlled temperature, frost-resistant fluid contained for circulation in said cavity;

d) an extended area coolant plate lying against said double skinned wall to extract heat from said storage chamber across said temperature buffering cavity; and e) a refrigeration unit thermally coupled to said coolant plate to remove heat therefrom;

whereby an accurately controlled temperature can be maintained throughout said interior wall surface of said storage chamber.

14. A method of refrigerating perishable organic products in a storage chamber having cooled interior walls comprised by double wall elements defining a cavity between inner and outer walls, said method comprising stabilizing temperatures within said storage chamber by:

a) temperature-buffering an interior wall of said storage chamber by circulating, frost-resistant fluid in said cavity; and b) employing said circulating frost-resistant fluid to extract heat from said storage chamber transversely across said circulating frost-resistant fluid to an extended surface coolant element in thermal contact with said circulating frost-resistant fluid;

whereby said interior wall of said storage chamber has a constant temperature over its surface.

15. A method according to claim 14 wherein, said interior walls are maintained at temperatures within about 0.1° C. of a temperature below about 4° C.

16. A method according to claim 14; wherein said constant temperature is near to 0° C.

17. A method according to claim 14 further comprising:

c) sensing the temperature of said frost-resistant fluid and thermostatically cyclically extracting heat from said coolant elements to maintain said frost-resistant fluid temperature to within 3° C. of a predetermined temperature.

18. A method according to claim 17 comprising effecting said heat extraction by cyclically operating a refrigeration unit at said 3° C. temperature limits.

19. A method according to claim 14 wherein said temperature-buffering is effected to within 0.5° C. of a predetermined temperature.

20. A method according to claim 18 wherein said temperatures are stabilized throughout said storage chamber to a constant temperature within a range of from about 0° C. to about 4° C.

21. A method according to claim 14 wherein said temperature-buffering and heat extraction steps are effected on multiple interior walls of said storage chamber, including a ceiling wall.

* * * * *